US012625489B2

(12) United States Patent
Leng et al.

(10) Patent No.: US 12,625,489 B2
(45) Date of Patent: May 12, 2026

(54) METHOD FOR CONSTRUCTING TOPOLOGY REFERENCE ARCHITECTURE FOR A PRODUCTION LINE

(71) Applicant: GUANGDONG UNIVERSITY OF TECHNOLOGY, Guangzhou (CN)

(72) Inventors: Jiewu Leng, Guangzhou (CN); Jiwei Guo, Guangzhou (CN); Xiaofeng Zhu, Guangzhou (CN); Caiyu Xu, Guangzhou (CN); Hongye Su, Guangzhou (CN); Qiang Liu, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 419 days.

(21) Appl. No.: 18/346,845

(22) Filed: Jul. 4, 2023

(65) Prior Publication Data

US 2024/0295873 A1 Sep. 5, 2024

(30) Foreign Application Priority Data

Mar. 3, 2023 (CN) .......................... 202310198392.6

(51) Int. Cl.
*G06F 15/16* (2006.01)
*G05B 19/418* (2006.01)
(Continued)

(52) U.S. Cl.
CPC .............................. *G05B 19/41865* (2013.01)

(58) Field of Classification Search
CPC .............. G05B 19/41865; Y02P 90/30; G06Q 10/06312; G06Q 50/04; G06N 3/006
(Continued)

(56) References Cited

U.S. PATENT DOCUMENTS 8,347,244 B2     1/2013  Alon et al.
8,624,921 B2 *   1/2014  McGreevy .............. G06T 11/00
                                                   345/440.1
(Continued)

FOREIGN PATENT DOCUMENTS

CN        111353551 A  *  6/2020  ......... G05B 13/0275
CN        113052435 A  *  6/2021  ....... G06Q 10/06316
(Continued)

OTHER PUBLICATIONS

A Similarity-Based Hierarchical Clustering Method for Manufacturing Process Models (Year: 2019).*

*Primary Examiner* — Hamza N Algibhah

(57)                    ABSTRACT

A method for constructing a topology reference structure for a production line is provided. The present disclosure is based on historical production line topology data of an enterprise to extract a commonly used topology reference structure for a production line of the enterprise by a computer through a machine learning (ML) algorithm, so as to form a typical production line topology group of the enterprise. The present disclosure can record typical production line characteristics and production habits of the enterprise, realize reuse of a production line structure and production line construction knowledge, reduce the workload of production line designers, and improve the production line construction efficiency of the enterprise. In addition, the present disclosure avoids the interference of designers' subjective decisions to a certain extent, and the reference structure extracted by the computer has high reference value, and is objective, mature, and stable.

7 Claims, 2 Drawing Sheets

(51) Int. Cl.
    *G06F 9/54*         (2006.01)
    *H04L 29/06*      (2006.01)

(58) Field of Classification Search
    USPC ........................................................ 709/223
    See application file for complete search history.

(56)           References Cited

U.S. PATENT DOCUMENTS

| | | | |
|---|---|---|---|
| 8,635,626 B2 | 1/2014 | Jula et al. | |
| 8,769,074 B2 | 7/2014 | Faraj | |
| 11,429,070 B2 * | 8/2022 | Leng | G06F 17/16 |
| 11,783,389 B2 * | 10/2023 | Usui | G06V 10/762 |
| | | | 705/7.35 |
| 2006/0285755 A1 * | 12/2006 | Hager | G06V 20/653 |
| | | | 382/224 |
| 2007/0219929 A1 * | 9/2007 | Steinbach | G06Q 10/06 |
| | | | 700/96 |
| 2010/0079488 A1 * | 4/2010 | McGreevy | G09G 5/14 |
| | | | 345/629 |
| 2014/0085332 A1 * | 3/2014 | McGreevy | G09G 5/00 |
| | | | 345/629 |
| 2021/0286326 A1 * | 9/2021 | Leng | G06F 17/16 |
| 2021/0365794 A1 * | 11/2021 | Balabin | G06N 3/045 |
| 2021/0397901 A1 * | 12/2021 | Liu | G06F 18/2193 |
| 2022/0075793 A1 * | 3/2022 | Jezewski | G06N 5/04 |
| 2023/0195089 A1 * | 6/2023 | Chiu | G05B 19/41885 |
| | | | 700/100 |
| 2023/0205509 A1 * | 6/2023 | Baral | G06Q 10/06 |
| | | | 717/172 |

FOREIGN PATENT DOCUMENTS

| | | | | |
|---|---|---|---|---|
| CN | 113093665 A | * | 7/2021 | G05B 19/41865 |
| CN | 110599018 B | * | 6/2022 | G06Q 10/0637 |
| CN | 117252382 A | * | 12/2023 | G06Q 10/06311 |
| CN | 118228903 A | * | 6/2024 | G06Q 10/087 |
| CN | 119358996 B | * | 4/2025 | G06F 16/27 |
| EP | 3667576 A1 | * | 6/2020 | G06Q 50/04 |
| KR | 101022230 B1 | * | 3/2011 | G06Q 10/063 |
| TW | 1883768 B | * | 5/2025 | G06Q 10/06316 |

* cited by examiner

METHOD FOR CONSTRUCTING TOPOLOGY REFERENCE ARCHITECTURE FOR A PRODUCTION LINE

CROSS-REFERENCE TO RELATED APPLICATIONS

This application claims priority to Chinese Patent Application No. 202310198392.6 with a filing date of Mar. 3, 2023. The content of the aforementioned application, including any intervening amendments thereto, is incorporated herein by reference.

TECHNICAL FIELD

The present disclosure relates to the technical field of production line construction for enterprises, and in particular to a method for constructing a topology reference structure for a production line.

BACKGROUND

At present, production lines constructed by traditional methods are constructed from beginning to end based on specific requirements on production functions, or constructed by combining multiple existing small work stations that perform specific production tasks into a production line according to their functions. These methods basically adopt serial design, without considering the overall situation of the production line, and require a long construction cycle. In addition, they are faced with problems such as insufficient connection and integration, and heavy reliance on designers' experience, which inevitably leads to many unreasonable aspects in the design. Currently, there are many complex production lines at home and abroad that fail to meet the pre-designed targets due to unreasonable or incorrect initial planning. Traditional methods for constructing production lines may not pose major problems for small enterprises with a small number of simply structured production lines. However, they will bring huge workload and production risks to large enterprises with a large number of complexly structured production lines. Furthermore, as traditional methods for constructing production lines cannot achieve reuse of the production line structure, they have significantly low construction efficiency and increase the enterprise's research and development costs.

SUMMARY

In order to overcome the shortcomings in the prior art, an objective of the present disclosure is to provide a method for constructing a topology reference structure for a production line. The present disclosure is based on the historical production line topology data of an enterprise to extract a commonly used topology reference structure for the production lines of the enterprise by a computer through a machine learning (ML) algorithm, so as to form a typical production line topology group of the enterprise. The present disclosure can record typical production line characteristics and production habits of the enterprise, realize reuse of a production line structure and production line construction knowledge, reduce the workload of production line designers, and improve the production line construction efficiency of the enterprise. In addition, the present disclosure avoids the interference of designers' subjective decisions to a certain extent, and the reference structure extracted by the computer has high reference value, and is objective, mature, and stable.

To achieve the above objective, the present disclosure provides the following technical solution.

The method for constructing a topology reference structure for a production line includes the following steps:

S1: calculating a comprehensive similarity between a first production line $x_A$ and a second production line $x_B$;

S2: calculating a similarity parameter $S_{A,B}$ between the first production line $x_A$ and the second production line $x_B$ based on the comprehensive similarity;

S3: calculating a similarity parameter $s_{i,j}$ between each two production lines $x_i$ and $x_j$ in n historical production lines according to steps S1 and S2, and forming a fuzzy compatibility matrix S of the n historical production lines;

S4: constructing a multi-granularity quotient space based on the fuzzy compatibility matrix S;

S5: selecting an optimal granular layer from the multi-granularity quotient space; and S6: constructing the topology reference structure for the production line based on the optimal granular layer.

In one embodiment, the calculating the comprehensive similarity between the first production line $x_A$ and the second production line $x_B$ specifically includes:

S11: calculating a matching degree and similarity between a first device $v_{A,i}$ in the first production line $x_A$ and a second device $V_{B,j}$ in the second production line $x_B$ in terms of four properties, to obtain a comprehensive similarity between the first device $V_{A,i}$ and the second device $V_{B,j}$; wherein, the four properties include material, production process, product category, and production quality;

S12: calculating the comprehensive similarity $s_{act}(V_{A,j}, V_{B,j})$ between each pair of devices from the first production line $x_A$ and the second production line $x_B$ according to S11; and calculating the comprehensive similarity $s_{act}(x_A, x_B)$ between the first production line $x_A$ and the second production line $x_B$ based on the comprehensive similarity between each pair of devices and a number of devices; wherein, calculation equations are as follows:

$$s_{act}(v_{A,i}, v_{B,j}) = \begin{cases} ss_{type} + ss_{fea}, & ss_{mat} = 1 \,\&\, ss_{qua} = 1 \\ 0, & \text{otherwise} \end{cases} \quad (1\text{-}2)$$

$$s_{act}(x_A, x_B) = \frac{\sum_{v_{A,i}}\sum_{v_{B,j}} \max(s_{act}(v_{A,i}, v_{B,j})) + \sum_{v_{B,j}}\sum_{v_{A,i}} \max(s_{act}(v_{A,i}, v_{B,j}))}{V_A + V_B} \quad (1\text{-}3)$$

where, $SS_{fea}$ represents an ontology similarity of product category between the first device $V_{A,i}$ and the second device $V_{B,j}$; $SS_{type}$ represents an ontology similarity of production quality between the first device $v_{A,i}$ and the second device $V_{B,j}$; $SS_{mat}$ represents a material matching degree between the first device $V_{A,i}$ and the second device $V_{B,j}$, and the material matching degree is 1 in a compatible case and 0 in a non-compatible case; $SS_{qua}$ represents a production process matching degree between the first device $V_{A,i}$ and the second device $V_{B,j}$, and the production process matching degree is 1 in a compatible case and 0 in a non-compatible case; $V_A$ represents a number of devices in the first production line $x_A$; and $V_B$ represents a number of devices in the second production line $x_B$;

In one embodiment, the calculating the similarity $S_{A,B}$ between the first production line $x_A$ and the second production line $x_B$ specifically includes:

calculating a similarity $S_{seq}(x_A, x_B)$ between a topology of the first production line $x_A$ and a topology of the second production line $x_B$:

$$s_{seq}(x_A, x_B) = \frac{2 * M_{A,B}}{E_A + E_B} \qquad (1\text{-}4)$$

calculating the similarity $S_{A,B}$ between the first production line $x_A$ and the second production line $x_B$:

$$s_{A,B} = w_{act} * s_{act}(x_A, x_B) + w_{seq} * s_{seq}(x_A, x_B) \qquad (1\text{-}5)$$

where, $M_{A,B}$ represents a number of matched relationship edges between the first production line $x_A$ and the second production line $x_B$; $E_A$ represents a total number of relationship edges in the first production line $x_A$; $E_B$ represents a total number of relational edges in the second production line $x_B$; $w_{act}$ represents a weight of the similarity between devices in the first and second production lines in determining the similarity between the first production line $x_A$ and the second production line $x_B$; and $w_{seq}$ represents a weight of the similarity between topologies of the first and second production lines in determining the similarity between the first production line $x_A$ and the second production line $x_B$.

In one embodiment, the fuzzy compatibility matrix S is expressed as follows:

$$S = [s_{i,j}]_{n \times n} = \begin{bmatrix} 1 & & & & & & \\ \vdots & \ddots & & & & & \\ s_{i,1} & \cdots & 1 & & & & \\ \vdots & \vdots & \vdots & \ddots & & & \\ s_{j,1} & \cdots & s_{j,i} & \cdots & 1 & & \\ \vdots & \vdots & \vdots & \vdots & \vdots & \ddots & \\ s_{n,1} & \cdots & s_{n,i} & \cdots & s_{n,j} & \cdots & 1 \end{bmatrix} \qquad (1\text{-}6)$$

where, the similarity between identical production lines is 1, and $S_{i,j} = S_{j,j}$.

In one embodiment, step S4 includes: inputting the fuzzy compatibility matrix S; and outputting a series of granular layers $\{X(\lambda) | 0 \leq 1 \leq 1\}$, with different granularities and mutual transformability according to a granular computing algorithm of a fuzzy compatibility quotient space, wherein X represents the granular layers, and $\lambda$ represents the granularities; the series of granular layers form the multi-granularity quotient space; and a specific calculation process is as follows:

step 1: performing $1^{st}$ to $m^{th}$ loops to calculate m granularities$\lambda$ to acquire m granular layers, wherein the following steps are executed in each loop:

step 1.1: initializing historical production line sets A={$x_1$, $x_2$, . . . , $x_n$}, B=Ø, and C=Ø;

step 1.2: traversing the production line in the set A, wherein the following steps are executed in each traversal;

step 1.2.1: transferring initial production lines $x_j$ from the set A to the set B during a first loop;

step 1.2.2: traversing current production lines $x_k$ in the set A during a second loop;

step 1.2.2.1: determining if a similarity $S(x_j, x_k)$ between the initial production lines $x_j$ and the current production lines $x_k$ is greater than or equal to the granularity; if not, return to step 1.2.2; and if yes, executing the following steps:

step 1): transferring the current production lines $x_k$ from the set A to the set B;

step 2): traversing production lines $x_s$ in the set A during a third loop;

step 3): determining if a similarity $S(k,x_s)$ between the production lines $x_k$ and the production lines $x_s$ is greater than or equal to the granularity; if yes, transferring the production lines $x_s$ from the set A to the set B; and if not, moving on to step 2);

step 1.2.3: incorporating the set B into the set C to serve as a subset of the set C; and step 1.2.4: determining if the set A is an empty set; if yes, returning to the granular layer $X(\lambda)=C$ corresponding to the granularity $\lambda$, and ending the first loop; and if not, letting the set B=Ø, skipping a current loop, and moving on to a next loop; and step 1.3: determining if i is equal to m; if yes, ending the loop, and exiting; and if not, continuing the for loop; and outputting m granular layers $X(\lambda)=C$ corresponding to the granularities In one embodiment, the selecting an optimal granular layer from the multi-granularity quotient space includes:

evaluating a granularity of a quotient space $X(\lambda)$ based on a Shannon information entropy concept, where the granularity of the quotient space is defined as an average amount of information required to completely distinguish all production lines in the granular layer;

$$E[X(\lambda_k)] = \sum_{i=1}^{g} \frac{|G_i|}{n} * \log_2(|G_i|) \qquad (1\text{-}7)$$

where, g represents a number of production line granules in the quotient space $X(\lambda_k)$; $G_i$ represents an $i^{th}$ production line granule in the quotient space $X(\lambda_k)$; $|G_i|$ represents a number of production lines in the $i^{th}$ production line granule in the quotient space $X(\lambda_k)$; and $\log_2(|G_i|)$ represents an amount of information required to completely distinguish all the production lines in the production line granule G (assuming that a probability of classifying a $j^{th}$ production line individual in the production line granule G; into a class is equal);

calculating an information gain generated during a refinement process from a coarse-grained quotient space $X(\lambda_{k-1})$ with a large information entropy to a fine-grained quotient space $X(\lambda_k)$ as follows:

$$IG[X(\lambda_k)] = E[X(\lambda_{k-1})] - E[X(\lambda_k)] \qquad (1\text{-}8)$$

finding the quotient space with the optimal granularity based on the information gain and the comprehensive similarity.

In one embodiment, the constructing the topology reference structure for a production line based on the optimal granular layer includes:

extracting a typical production line topology sequence of production lines in each production line granule in the quotient space with the optimal granularity;

calculating, by a dynamic programming method improved based on a longest common subsequence (LCS) algorithm, an LCS of all the production lines in each production line granule in the quotient space with the optimal granularity, where a number of LCSs belonging to different production line granules is equal to a number of the production line granules in the quotient space with the optimal granularity;

performing, by an ontology-based computing method, property abstraction on each LCS to acquire a lowest superclass of all device properties in a domain ontology, so as to improve versatility and representativeness:

$$vtr_{j,j\in LCS} = C_{super}(vt_{1,j}, vt_{2,j}, \dots, vt_{i,j}) \qquad (1\text{-}10)$$

where, $C_{super}(vt_{1,j}, vt_{2,j}, \dots, vt_{i,j})$ represents abstract properties of a $j^{th}$ matched production line device node of all i production lines;

further assembling an abstract set of all production line device nodes and production line topology relationship edges into a new topology reference structure for a production line, where the topology reference structure for a production line corresponding to each production line granule is expressed as:

$$PRM_i = (Vr_i, Er_i, vtr_i) \qquad (1\text{-}11)$$

where, $Vr_i = \{vr_{i,1}, vr_{i,2}, \dots, vr_{1,n}\}$ represents a set of matched production line device nodes; $vtr_i$ represents a lowest superclass of abstract device properties; and $Er_i = \{er_{i,j,k} | er_{i,j,k} = vr_{i,j}*vr_{i,k}, 1 \le j, k \le n\}$ represents an abstract set of production line topology relationship edges; and extracting a topology reference structure for a production line from each production line granule in the quotient space with the optimal granularity, where each topology reference structure for a production line is manifested by the set of matched production line device nodes and the abstract set of production line topology relationship edges.

In one embodiment, the calculating, by a dynamic programming method improved based on an LCS algorithm, an LCS of all production lines (for example, the production line $x_A$ and the production line $x_B$) in each production line granule in the quotient space with the optimal granularity includes:

1) starting matching from a first production line device node in a production line topology;

2) matching, based on a recursive equation, production line device nodes backwards one by one, and stacking a successfully matched production line device node into $LCS_{(i,j)}$:

$$LCS_{(i,j)} = \begin{cases} \max\{LCS_{(i-1,j)}, LCS_{(i,j-1)}\} & s_{act}(v_{A,i}, v_{B,j}) < s_t \\ LCS_{(i-1,j-1)} \cup \{C_{super}(v_{A,i}, v_{B,j})\} & s_{act}(v_{A,i}, v_{B,j}) \ge s_t \\ 0 & i=0 \| j=0 \end{cases} \qquad (1\text{-}9)$$

where, S, represents a user preset similarity threshold for distinguishing a similar device from a non-similar device; and $C_{super}(v_{A,i}, v_{B,j})$ represents abstract properties between two matched production line device nodes, that is, a superclass;

3) repeating steps 1) and 2) to acquire a final LCS 4) matching, if a production line granule includes more than two production lines, the $LCS_{(i,j)}$ acquired by steps 1) to 3) and remaining production lines one by one, that is, repeating steps 1) to 3) until all production lines are matched, thus acquiring a final LCS corresponding to the production line granule.

Compared with the prior art, the principles and advantages of the present disclosure are as follows:

The present disclosure is based on the historical production line topology data of an enterprise to extract a commonly used topology reference structure for a production line of the enterprise by a computer through a machine learning (ML) algorithm, so as to form a typical production line topology group of the enterprise. The present disclosure can record typical production line characteristics and production habits of the enterprise, realize reuse of a production line structure and production line construction knowledge, reduce the workload of production line designers, and improve the production line construction efficiency of the enterprise. In addition, the present disclosure avoids the interference of designers' subjective decisions to a certain extent, and the reference structure extracted by the computer has high reference value, and is objective, mature, and stable.

BRIEF DESCRIPTION OF THE DRAWINGS

To describe the technical solutions in the embodiments of the present disclosure or in the prior art more clearly, the following briefly describes the drawings required for describing the embodiments or the prior art. Apparently, the drawings in the following description show merely some embodiments of the present disclosure, and a person of ordinary skill in the art may still derive other drawings from these drawings without creative efforts.

DETAILED DESCRIPTION OF THE EMBODIMENTS

In the present disclosure, basic concepts are defined before specific embodiments are explained.

Each production line is provided with multiple devices for collaborative processing and manufacturing, and different devices have different production function properties. The present disclosure selects four dimensions of indicators (material, production process, product category, and production quality) for measurement. Multiple devices with different properties can be combined in different order to form a production line. The arrangement structure of the multiple devices refers to a topology of the production line.

For example, the commonly used devices in a mobile phone production line include: surface mount system, labeling machine, potting machine, soldering machine, dispensing machine, and inkjet printer. Each device includes four dimensions of properties: a. material: plastic parts, electronic parts, hardware, packaging materials, etc.; b. production process: solder paste printing, painting, silk screening, welding, assembly, etc.; c. product category: computer, communication, and consumer electronics (3C) products, household appliances, food, clothing, etc.; and d. production quality: rough machining, finishing, precision machining, etc. The topologies of the mobile phone production line are arrangement structures for combining these commonly used devices according to different production plans and processing sequences. Obviously, the type and quantity of the devices and the arrangement structure of the devices required for different products are different to form, for example, a linear production line structure, a U-shaped production line structure, a tree-type production line structure, a ring-type production line structure, etc.

The present disclosure is described in further detail below according to a specific embodiment.

Figure 1:
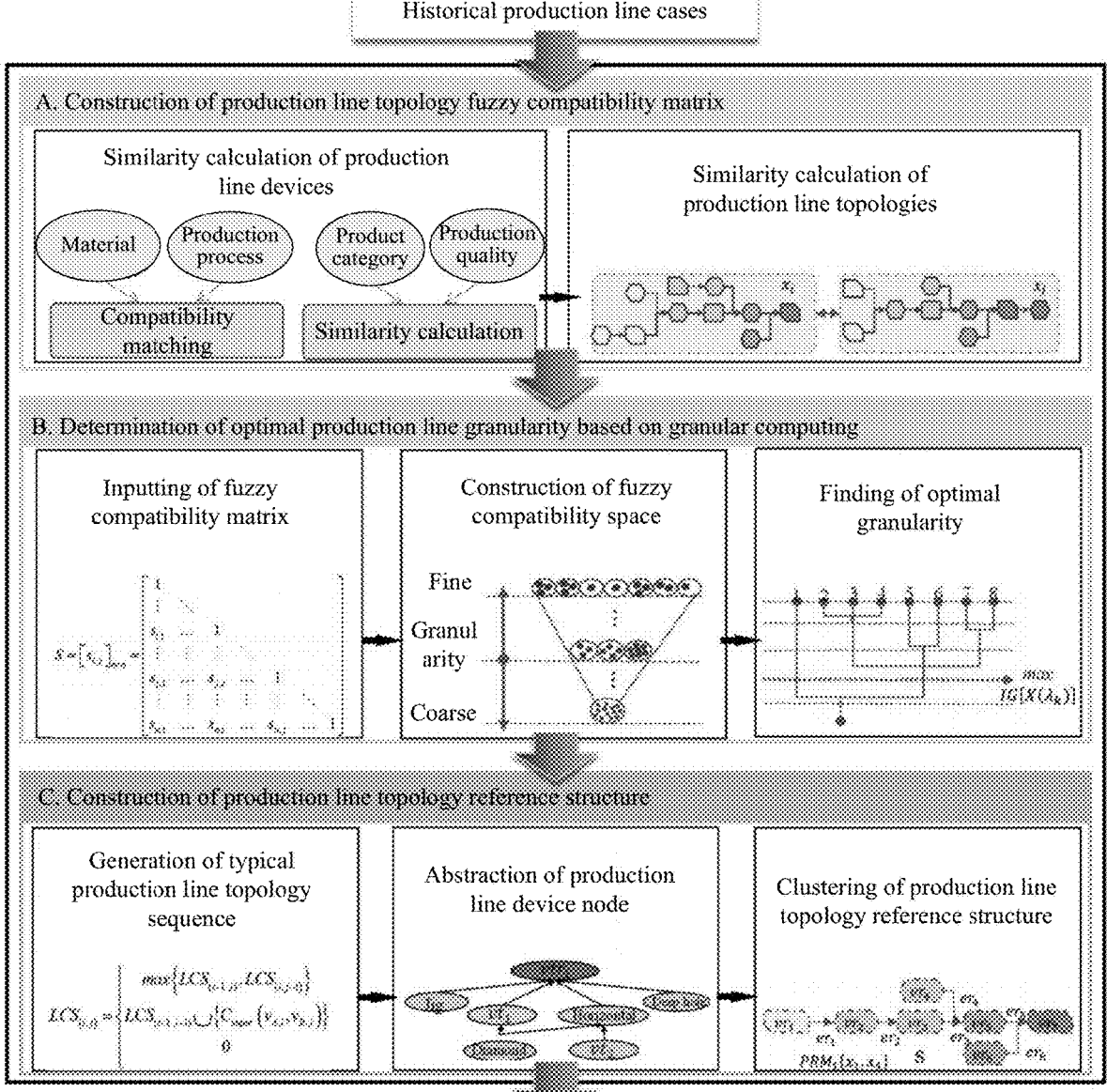
FIG. 1 is a flowchart showing a method for constructing a topology reference structure for a production line according to the present disclosure.

As shown in FIG. 1, the embodiment provides a method for constructing a topology reference structure for a production line, which includes three stages.

Firstly, a similarity of production lines is calculated based on device properties and production line topologies. At this stage, ontological comprehensiveness and semantic similarity calculation techniques are used. Secondly, a fuzzy compatibility quotient space is constructed. Through comprehensive consideration and calculation of an information gain and the similarity, an optimal granularity for clustering the production line topologies is calculated to acquire a more representative and accurate granule. Finally, by analyzing the similarity and matching relationship between a device node and a relationship edge of the production line topology, a common subgraph of each granule in an optimal granular layer is identified, and a topology reference structure for a production line is formed by merging.

The method specifically includes the following steps.

S1. A comprehensive similarity between a production line $x_A$ and a production line $x_B$ is calculated. S1 specifically comprises the following steps S11 and S12.

S11. A matching degree and similarity between a device $V_{A,i}$ in the production line $x_A$ and a device $V_{B,j}$ in the production line $x_B$ in terms of four properties are calculated, and a comprehensive similarity between the device $V_{A,i}$ and the device $V_{B,j}$ is acquired.

The four properties include material, production process, product category, and production quality.

S12. According to S11, the comprehensive similarity $S_{act}$ $(v_{A,j}, V_{B,j})$ between each pair of devices from the production line $x_A$ and the production line $x_B$ is calculated. Based on the comprehensive similarity between each pair of devices and a number of devices, the comprehensive similarity $S_{act}$ $(x_A, x_B)$ between the production line $x_A$ and the production line $x_B$ is calculated.

Calculation equations are as follows:

$$s_{act}(v_{A,i}, v_{B,j}) = \begin{cases} ss_{type} + ss_{fea}, & ss_{mat} = 1 \ \& \ ss_{qua} = 1 \\ 0, & \text{otherwise} \end{cases} \quad (1\text{-}2)$$

$$s_{act}(x_A, x_B) = \frac{\sum_{v_{A,i}}\sum_{v_{B,j}} \max(s_{act}(v_{A,i}, v_{B,j})) + \sum_{v_{B,j}}\sum_{v_{A,i}} \max(s_{act}(v_{A,i}, v_{B,j}))}{V_A + V_B} \quad (1\text{-}3)$$

Where, $SS_{fea}$ represents an ontology similarity of product category between the device $V_A$, and the device $V_{B,j}$; $SS_{type}$ represents an ontology similarity of production quality between the device $V_{A,i}$ and the device $V_{B,j}$; $SS_{mat}$ represents a material matching degree between the device $V_A$, and the device $V_{B,j}$, and the material matching degree is 1 in a compatible case and 0 in a non-compatible case; $SS_{qua}$ represents a production process matching degree between the device $V_{A,i}$ and the device $V_{B,j}$, and the production process matching degree is 1 in a compatible case and 0 in a non-compatible case; $V_A$ represents a number of devices in the production line $x_A$; and $V_B$ represents a number of devices in the production line $x_B$.

S2. A similarity $S_{A,B}$ between the production line $x_A$ and the production line $x_B$ is calculated based on the comprehensive similarity between the production line $x_A$ and the production line $x_B$.

A similarity $S_{seq}$ $(x_A, x_B)$ between a topology of the production line $x_A$ and a topology of the production line $x_B$ is calculated:

$$s_{seq}(x_A, x_B) = \frac{2 * M_{A,B}}{E_A + E_B} \quad (1\text{-}4)$$

The similarity $S_{A,B}$ between the production line $x_A$ and the production line $x_B$ is calculated:

$$s_{A,B} = w_{act} * s_{act}(x_A, x_B) + w_{seq} * s_{seq}(x_A, x_B) \quad (1\text{-}5)$$

Where, $M_{A,B}$ represents a number of matched relationship edges between the production line $x_A$ and the production line $x_B$; $E_A$ represents a total number of relationship edges in the production line $x_A$; $E_B$ represents a total number of relational edges in the production line $x_B$; $w_{act}$ represents a weight of the similarity between devices in the production lines in determining the similarity between the production line $x_A$ and the production line $x_B$; and $w_{seq}$ represents a weight of the similarity between topologies of the productions lines in determining the similarity between the production line $x_A$ and the production line $x_B$.

S3. A similarity $s_{i,j}$ between each two production lines x, and x, inn historical production lines is calculated according to steps S1 and S2, and a fuzzy compatibility matrix S of the n historical production lines is formed. The fuzzy compatibility matrix S is expressed as follows:

$$S = [s_{i,j}]_{n \times n} = \begin{bmatrix} 1 \\ \vdots & \ddots \\ s_{i,1} & \cdots & 1 \\ \vdots & \vdots & \vdots & \ddots \\ s_{j,1} & \cdots & s_{j,i} & \cdots & 1 \\ \vdots & \vdots & \vdots & \vdots & \vdots & \ddots \\ s_{n,1} & \cdots & s_{n,i} & \cdots & s_{n,j} & \cdots & 1 \end{bmatrix} \quad (1\text{-}6)$$

The similarity between identical production lines is 1, and $S_{i,j}=S_{j,i}$.

S4. A multi-granularity quotient space is constructed based on the fuzzy compatibility matrix S.

The fuzzy compatibility matrix S is input according to a granular computing algorithm of a fuzzy compatibility quotient space; and a series of granular layers $\{X(\lambda)|0 \le \lambda \le 1\}$, namely, quotient spaces, with different granularities and mutual transformation, are output where X represents the granular layer, and $\lambda$ represents the granularity. A specific calculation process is as follows.

The fuzzy compatibility matrix S is input.

Step 1. For loop: $1^{st}$ to $m^{th}$ loops are performed, that is, m granularities $\lambda_i$ are calculated to acquire m granular layers.

Step 1.1. Historical production line case sets A={x_1, x_2, . . . , x_n}, B=Ø, and C=Ø are initialized.

Step 1.2. For-each loop I: each production line $x_j$ in the set A is traversed.

Step 1.2.1. The production line $x_j$ is transferred from the set A to the set B.

Step 1.2.2. For-each loop II: each production line $x_k$ in the set A is traversed.

Step 1.2.2.1. If: it is determined if a similarity $S(x_j, x_k)$ between the production line $x_j$ and the production line $x_k$ is greater than or equal to the granularity $\lambda_i$. If not, the operation moves on to a next loop of the for-each loop II. If yes, the following steps are performed.

Step 1). The production line $x_k$ is transferred from the set A to the set B.

Step 2). For-each loop III: each production line $x_s$ in the set A is traversed.

Step 3). If: it is determined if a similarity $S(x_k, x_s)$ between the production line $X_K$ and the production line $x_s$ is greater than or equal to the granularity Mj. If yes, the production line $x_s$ is transferred from the set A to the set B. If not, the operation moves on to a next loop of the for-each loop III.

Step 1.2.3. The set B is incorporated into the set C to serve as a subset of the set C.

step 1.2.4. If: it is determined if the set A is an empty set. If yes, the operation returns to the granular layer $X(\lambda)=C$ corresponding to the granularity $\lambda_i$, and the for-each loop I is ended. If not, let the set B=∅, and the operation skips a current loop, and moves on to a next loop.

Step 1.3. If: it is determined if i is equal to m. If yes, the for loop is ended, and the algorithm is ended. If not, the for loop is continued.

m granular layers $X(\lambda)=C$ corresponding to the granularities $\lambda_i$ are output.

Figure 2:
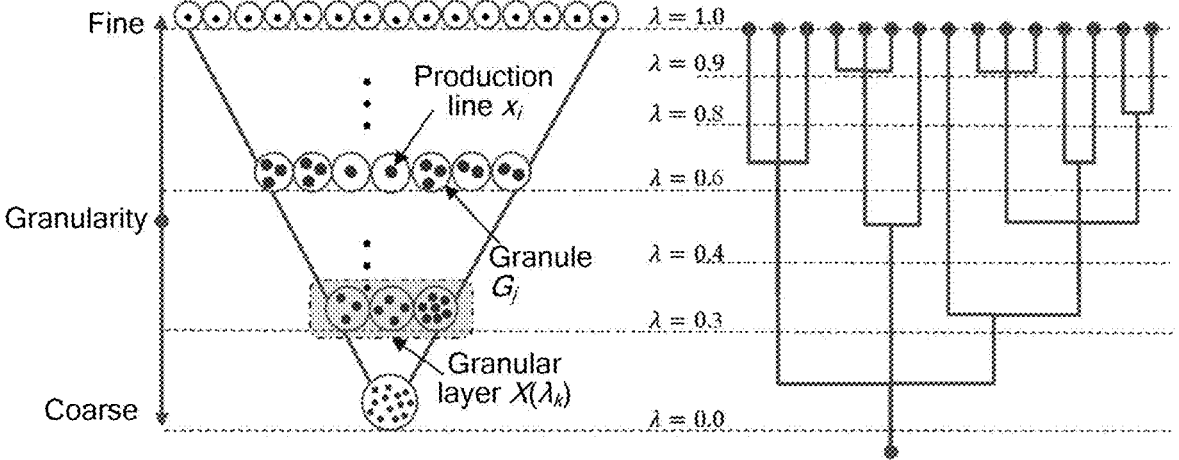
FIG. 2 is a schematic diagram showing a fuzzy compatibility quotient space.

The algorithm finally outputs the quotient space of all production line granules in S. As shown in FIG. 2, different granularities 2 correspond to quotient spaces with different granularities, i.e., granular layers with different granularities. A larger granularity 2 indicates a finer granularity of the quotient space, more production line granules in the granular layer, and fewer production lines in each production line granule.

S5. The hierarchical structure of S includes a series of granular layers, but not all granular layers can provide as much valuable information as possible to support the construction of the topology reference structure for a production line. The number of production line granules in the quotient space is proportional to the granularity of the quotient space. Although more granules can form more reference structures, if the granularity of the quotient space becomes smaller (i.e., 2 becomes larger), the similarity threshold between the production lines that generate the granular layer becomes larger. This means that a typical production line topology cannot be effectively abstracted, so the typical production line topology sequence is excessively long, making the extracted typical production line topology sequence not highly versatile. On the contrary, if the granularity of the quotient space becomes thicker (that is, 2 becomes smaller), the similarity threshold between the production lines that generate the granular layer becomes smaller, resulting in fewer production line granules and lower similarity between the production lines. This situation can lead to an excessively short typical production line topology sequence, making the extracted typical production line topology sequence not highly adaptive. Therefore, in order to find a typical topology reference structure for a production line that is more adaptive and versatile, this embodiment uses two metrics to measure the granulation effect (information gain and minimum similarity), so as to find the optimal granular layer. The process is as follows.

evaluating a granularity of a quotient space $X(\lambda_k)$ based on a Shannon information entropy concept, where the granularity of the quotient space is defined as an average amount of information required to completely distinguish all production lines in the granular layer;

$$E[X(\lambda_k)] = \sum_{i=1}^{g} \frac{|G_i|}{n} * \log_2(|G_i|) \tag{1-7}$$

Where, g represents a number of production line granules in the quotient space $X(\lambda_k)$; $G_i$ represents an $i^{th}$ production line granule in the quotient space $X(\lambda)$; $|G_i|$ represents a number of production lines in the $i^{th}$ production line granule in the quotient space $X(\lambda_k)$; and $\log_2(|G_i|)$ represents an amount of information required to completely distinguish all the production lines in the production line granule G, (assuming that a probability of classifying a $j^{th}$ production line individual in the production line granule G, into a class is equal).

An information gain generated during a refinement process from a coarse-grained quotient space $X(\lambda_{k-1})$ with a large information entropy to a fine-grained quotient space $X(\lambda_k)$ is calculated as follows:

$$IG[X(\lambda_k)] = E[X(\lambda_{k-1})] - E[X(\lambda_k)] \tag{1-8}$$

Finally, a quotient space with a maximum information gain and a minimum similarity is selected as the quotient space with an optimal granularity.

S6. The topology reference structure for a production line is constructed based on the quotient space with the optimal granularity.

A typical production line topology sequence of production lines in each production line granule in the quotient space with the optimal granularity is extracted.

An LCS of all the production lines in each production line granule in the quotient space with the optimal granularity is calculated by a dynamic programming method improved based on an LCS algorithm. Take the production line $x_A$ and the production line $x_B$) as an example, this process specifically includes the following steps.

1) Matching is performed from a first production line device node in a production line topology.

2) Based on a recursive equation shown in Eq. (5-14), production line device nodes are matched backwards one by one, and a successfully matched production line device node is stacked into $LCS_{(i,j)}$.

$$LCS_{(i,j)} = \begin{cases} \max\{LCS_{(i-1,j)}, LCS_{(i,j-1)}\} & S_{act}(v_{A,i}, v_{B,j}) < s_t \\ LCS_{(i-1,j-1)} \cup \{C_{super}(v_{A,i}, v_{B,j})\} & S_{act}(v_{A,i}, v_{B,j}) \geq s_t \\ 0 & i = 0 || j = 0 \end{cases} \tag{1-9}$$

Where, $s_i$ represents a user preset similarity threshold for distinguishing a similar device from a non-similar device; $C_{super}(V_{A,j}, V_{B,j})$ represents abstract properties between two matched production line device nodes, that is, a superclass; and $S_{act}(v_{A,i}, v_{B,j})$ represents the comprehensive similarity between each pair of devices from the production line $x_A$ and the production line $x_B$.

3) Steps 1) and 2) are repeated to acquire a final $LCS_{(i,j)}$.

4) If a production line granule includes more than two production lines, the LCS (i.f) acquired by steps 1) to 3) and remaining production lines are matched one by one, that is, steps 1) to 3) are repeated until all production lines are matched, thus acquiring a final LCS corresponding to the production line granule.

Property abstraction is performed on each LCS by an ontology-based computing method to acquire a lowest superclass of all device properties in a domain ontology, so as to improve versatility and representativeness:

$$vtr_{j,j\in LCS} = C_{super}(vt_{1,j}, vt_{2,j}, \ldots, vt_{i,j}) \qquad (1-10)$$

$C_{super}$ $(vt_{1,j}vt_{2,j} \ldots, vt_{i,j})$ represents abstract properties of a $j^{th}$ matched production line device node of all i production lines.

An abstract set of all production line device nodes and production line topology relationship edges is further assembled into a new topology reference structure for a production line, where the topology reference structure for a production line corresponding to each production line granule is expressed as:

$$PRM_i = (Vr_i, Er_i, vtr_i) \qquad (1-11)$$

Where, $Vr_i = \{v_{i,1}, vr_{i,2} \ldots, vr_{i,n}\}$ represents a set of matched production line device nodes; vtr, represents a lowest superclass of abstract device properties; and $Er_i = \{er_{i,j,k} | er_{i,j,k} = vr_{i,j} * vr_{i,j}, 1 \leq j,k \leq n\}$ represents an abstract set of production line topology relationship edges.

A topology reference structure for a production line is extracted from each production line granule in the quotient space with the optimal granularity, where each topology reference structure is manifested by the set of matched production line device nodes and the abstract set of production line topology relationship edges.

The above described are only preferred embodiments of the present disclosure, and are not intended to limit the implementation scope of the present disclosure. Therefore, all changes made in accordance with the shapes and principles of the present disclosure should fall within the protection scope of the present disclosure.

What is claimed is:

1. A method for constructing a production line, comprising the following steps:

S1: calculating a comprehensive similarity between a first production line $x_A$ and a second production line $x_B$;

S2: calculating a similarity parameter $S_{A,B}$ between the first production line $x_A$ and the second production line $x_B$ based on the comprehensive similarity;

S3: calculating a similarity parameter $s_{i,j}$ between each two production lines $x_I$ and $x_j$ in n historical production lines according to steps S1 and S2, and forming a fuzzy compatibility matrix S of the n historical production lines;

S4: constructing a multi-granularity quotient space based on the fuzzy compatibility matrix S;

S5: selecting an optimal granular layer from the multi-granularity quotient space; and S6: constructing the topology reference structure for a production line for the production line based on the optimal granular layer;

S7: constructing the production line based on the topology reference structure for the production line;

wherein the calculating the comprehensive similarity between the first production line $x_A$ and the second production line $x_B$, specifically comprises:

S11: calculating a matching degree and similarity between a first device $V_{A,j}$ in the first production line $x_A$, and a second device $V_{B,j}$ in the second production line $x_B$, in terms of four properties, to obtain a comprehensive similarity between the first device VAI and the second device $V_B$, j wherein, the four properties comprise material, production process, product category, and production quality;

S12: calculating the comprehensive similarity $S_{act}$ ($V_{A,j}$, $V_{B,j}$) between each pair of devices from the first production line $x_A$ and the second production line $x_B$, according to S11; and calculating the comprehensive similarity $S_{act}$ ($x_A$, $x_B$) between the first production line $x_A$ and the second production line $x_B$ based on the comprehensive similarity between each pair of devices and a number of devices;

wherein, calculation equations are as follows:

$$s_{act}(v_{A,i}, v_{B,j}) = \begin{cases} ss_{type} + ss_{fea}, & ss_{mat} = 1 \,\&\, ss_{qua} = 1 \\ 0, & \text{otherwise} \end{cases} \qquad (1-2)$$

$$s_{act}(x_A, x_B) = \frac{\sum_{v_{A,i}} \sum_{v_{B,j}} \max(s_{act}(v_{A,i}, v_{B,j})) + \sum_{v_{B,j}} \sum_{v_{A,i}} \max(s_{act}(v_{A,i}, v_{B,j}))}{V_A + V_B} \qquad (1-3)$$

wherein, $SS_{fea}$ represents an ontology similarity of product category between the first device $V_{A,j}$ and the second device $V_{B,j}$; $SS_{type}$ represents an ontology similarity of product quality between the first device $V_{A,i}$ and the second device $V_{B,j}$; $SS_{mat}$ represents a material matching degree between the first device $V_{A,i}$ and the second device $V_{B,j}$, and the material matching degree is 1 in a compatible case and 0 in a non-compatible case; $SS_{qua}$ represents a production process matching degree between the first device $V_{A,i}$ and the second device $V_{B,j}$, and the production process matching degree is 1 in a compatible case and 0 in a non-compatible case; $V_A$ represents a number of devices in the first production line $x_A$; and $V_B$ represents a number of devices in the second production line $x_B$.

2. The method according to claim 1, wherein the calculating the similarity $S_{A,B}$ between the first production line $x_A$ and the second production line $x_B$ specifically comprises:

calculating a similarity $S_{seq}$ ($x_A$, $x_B$) between a topology of the first production line $x_A$ and a topology of the second production line $x_B$:

$$s_{seq}(x_A, x_B) = \frac{2 * M_{A,B}}{E_A + E_B} \qquad (1-4)$$

calculating a similarity $S_{A,B}$ between the first production line $x_A$ and the second production line $x_B$:

$$s_{A,B} = w_{act} * s_{act}(x_A, x_B) + w_{seq} * s_{seq}(x_A, x_B) \qquad (1-5)$$

wherein, $M_{A,B}$ represents a number of matched relationship edges between the first production line $x_A$ and the second production line $x_B$; $E_A$ represents a total number of relationship edges in the first production line $x_A$; $E_B$ represents a total number of relational edges in the second production line $x_B$; $W_{act}$ represents a weight of the similarity between devices in the first and second production lines in determining the similarity between the first production line $x_A$ and the second production line $x_B$; and $w_{seq}$ represents a weight of the similarity between topologies of the first and second production lines in determining the similarity between the first production line $x_A$ and the second production line $x_B$.

3. The method according to claim 1, wherein the fuzzy compatibility matrix S is expressed as follows:

$$S = [s_{i,j}]_{n \times n} = \begin{bmatrix} 1 & & & & & & \\ \vdots & \ddots & & & & & \\ s_{i,1} & \cdots & 1 & & & & \\ \vdots & \vdots & \vdots & \ddots & & & \\ s_{j,1} & \cdots & s_{j,i} & \cdots & 1 & & \\ \vdots & \vdots & \vdots & \vdots & \vdots & \ddots & \\ s_{n,1} & \cdots & s_{n,i} & \cdots & s_{n,j} & \cdots & 1 \end{bmatrix} \quad (1\text{-}6)$$

wherein, the similarity between identical production lines is 1 and $S_{i,j} = S_{j,i}$.

4. The method according to claim 1, wherein step S4 comprises: inputting the fuzzy compatibility matrix S; and outputting a series of granular layers $\{x(\lambda)10 \leq \lambda \leq 1\}$ with different granularities and mutual transformability according to a granular computing algorithm of a fuzzy compatibility quotient space, wherein X represents the granular layers, and $\lambda$ represents the granularities; the series of granular layers form the multi-granularity quotient space; and a specific calculation process is as follows:

step 1: performing $1^{st}$ to $m^{th}$ loops to calculate m granularities $\lambda$ to acquire m granular layers, wherein the following steps are executed in each loop:

step 1.1: initializing historical production line sets $A=\{x_1, x_2 \ldots, x_n\}$, $B=\emptyset$, and $C=\emptyset$;

step 1.2: traversing the production lines in the set A, wherein the following steps are executed in each traversal:

step 1.2.1 transferring initial production lines $x_j$ from the set A to the set B during a first loop:

step 1.2.2: traversing current production lines $x_k$ in the set A during a second loop;

step 1.2.2.1: determining if a similarity $S(x_k, x_s)$ between the initial production lines $x_j$ and the current production lines $x_k$ is greater than or equal to the granularity; if not, return to step 1.2.2; and if yes, executing the following steps:

step 1): transferring the current production lines $x_k$ from the set A to the set B;

step 2): traversing production lines x, in the set A during a third loop;

step 3): determining if a similarity $S(x_k, x_s)$ between the production lines $x_k$ and the production lines x, is greater than or equal to the granularity; if yes, transferring the production lines x, from the set A to the set B; and if not, moving on to step 2);

step 1.2.3: incorporating the set B into the set C to serve as a subset of the set C; and step 1.2.4: determining if the set A is an empty set; if yes, returning to the granular layer $X(\lambda)=C$ corresponding to the granularity $\lambda$, and ending the first loop; and if not, letting the set B=⊥, skipping a current loop, and moving on to a next loop; and step 1.3: determining if i is equal to m; if yes, ending the loop, and exiting; and if not, continuing the loop; and outputting m granular layers $X(\lambda)=C$ corresponding to the granularities $\lambda_i$.

5. The method according to claim 1, wherein the selecting an optimal granular layer from the multi-granularity quotient space comprises:

evaluating a granularity of a quotient space $X(\lambda_k)$ based on a Shannon information entropy concept, wherein the granularity of the quotient space is defined as an average amount of information required to completely distinguish all production lines in the granular layer;

$$E[X(\lambda_k)] = \sum_{i=1}^{g} \frac{|G_i|}{n} * \log_2(|G_i|) \quad (1\text{-}7)$$

wherein, g represents a number of production line granules in the quotient space $X(\lambda_k)$; $G_i$ presents an $i^{th}$ production line granule in the quotient space $X(\lambda_k)$: $[G_i]$ represents a number of production lines in the $i^{th}$ production line granule in the quotient space $X(\lambda_k)$; and $\log_2(|G_i|)$ represents an amount of information required to completely distinguish all the production lines in the production line granule $G_i$;

calculating an information gain generated during a refinement process from a coarse-grained quotient space $X(\lambda_{k-1})$ with a large information entropy to a fine-grained quotient space $X(\lambda_k)$ as follows:

$$IG[X(\lambda_k)] = E[X(\lambda_{k-1})] - E[X(\lambda_k)] \quad (1\text{-}8)$$

finding the quotient space with the optimal granularity based on the information gain and the comprehensive similarity.

6. The method according to claim 1, wherein the constructing the topology reference structure for a production line based on the optimal granular layer comprises:

extracting a typical production line topology sequence of production lines in each production line granule in the quotient space with the optimal granularity;

calculating, by a dynamic programming method improved based on a longest common subsequence (LCS) algorithm, an LCS of all the production lines in each production line granule in the quotient space with the optimal granularity;

performing, by an ontology-based computing method, property abstraction on each LCS to acquire a lowest superclass of all device properties in a domain ontology, so as to improve versatility and representativeness:

$$vtr_{j,j \in LCS} = C_{super}(vt_{1,j}, vt_{2,j}, \ldots, vt_{i,j}) \quad (1\text{-}10)$$

wherein, $C_{super}(vt_{i,j}, vt_{2,j}, \ldots vt_{i,j})$ represents abstract properties of a $j^{th}$ matched production line device node of all i production lines;

further assembling an abstract set of all production line device nodes and production line topology relationship edges into a new topology reference structure for a production line, wherein the topology reference structure for a production line corresponding to each production line granule is expressed as:

$$PRM_i = (Vr_i, Er_i, vtr_i) \qquad (1\text{-}11)$$

wherein, $Vr_i = \{vr_{i,2} vr_{i,2} \ldots vr_{i,n}\}$ represents a set of matched production line device nodes; $vtr_i$ represents a lowest superclass of abstract device properties; and $Er_i = \{er_{i,j,A} | er_{i,j,k} = vr_{i,j} * vr_{i,k} 1 \leq j, k \leq n,\}$ represents an abstract set of production line topology relationship edges; and extracting a topology reference structure for a production line from each production line granule in the quotient space with the optimal granularity, wherein each topology reference structure for a production line is manifested by the set of matched production line device nodes and the abstract set of production line topology relationship edges.

7. The method according to claim 6, wherein the calculating, by a dynamic programming method improved based on the LCS algorithm, an LCS of all the production lines in each production line granule in the quotient space with the optimal granularity comprises:

1) starting matching from a first production line device node in a production line topology;

2) matching, based on a recursive equation, production line device nodes backwards one by one, and stacking a successfully matched production line device node into $LCS_{(i,j)}$:

$$LCS_{(i,j)} = \begin{cases} \max\{LCS_{(i-1,j)}, LCS_{(i,j-1)}\} & s_{act}(v_{A,i}, v_{B,j}) < s_t \quad (1\text{-}9) \\ LCS_{(i-1,j-1)} \cup \{C_{super}(v_{A,i}, v_{B,j})\} & s_{act}(v_{A,i}, v_{B,j}) \geq s_t \ . \\ 0 & i = 0 \| j = 0 \end{cases}$$

wherein, $s_t$ represents a user preset similarity threshold for distinguishing a similar device from a non-similar device; $C_{super}$ ($V_{A,i}$, $V_{B,j}$) represents abstract properties between two matched production line device nodes, that is, a superclass; and $S_{act}$ ($V_{Aj}$, $V_{B,j}$) represents the comprehensive similarity between each pair of devices from the production line $x_A$ and the production line $x_B$;

3) repeating steps 1) and 2) to acquire a final LCS(s);

4) matching, if a production line granule comprises more than two production lines, the $LCS_{(i,j)}$ acquired by steps 1) to 3) and remaining production lines one by one, that is, repeating steps 1) to 3) until all production lines are matched, thus acquiring a final LCS corresponding to the production line granule.

* * * * *